(12) United States Patent
Puetz et al.

(10) Patent No.: US 7,076,875 B2
(45) Date of Patent: Jul. 18, 2006

(54) METHOD OF MANUFACTURING COMPOUND HELICAL PLANET GEARS HAVING DIFFERENT LEADS

(75) Inventors: Craig Alan Puetz, Waterloo, IA (US); Paul Warren Johnson, Denver, IA (US)

(73) Assignee: Deere & Company, Moline, IL (US)

( * ) Notice: Subject to any disclaimer, the term of this patent is extended or adjusted under 35 U.S.C. 154(b) by 184 days.

(21) Appl. No.: 10/242,367

(22) Filed: Sep. 12, 2002

(65) Prior Publication Data
US 2004/0049919 A1 Mar. 18, 2004

(51) Int. Cl.
*B23P 15/14* (2006.01)
*B21D 53/28* (2006.01)

(52) U.S. Cl. ............... 29/893.35; 29/893; 29/893.3; 29/893.36; 409/10; 409/12; 409/61; 475/342

(58) Field of Classification Search ............... 29/893.3, 29/893.35, 893.36, 893.33, 893.31, 893, 29/464, 467; 475/342; 409/10, 61, 12, 26, 409/51
See application file for complete search history.

(56) References Cited

U.S. PATENT DOCUMENTS

| | | |
|---|---|---|
| 1,788,701 A | 1/1931 | Bethune |
| 1,861,258 A | 5/1932 | Bethune |
| 1,989,663 A | 2/1935 | Bethune |
| 2,982,146 A | 5/1961 | Stoeckicht |
| 3,011,365 A | 12/1961 | Stoeckicht |
| 3,102,433 A | 9/1963 | Stoeckicht |
| 3,776,067 A | 12/1973 | DeBruyne et al. |
| 4,065,981 A | 1/1978 | Whateley et al. |
| 4,187,735 A | 2/1980 | Terry |
| 4,372,176 A | 2/1983 | Terry |
| 4,416,168 A | 11/1983 | Arai et al. |
| 4,429,594 A | 2/1984 | Heller |
| 4,463,620 A | 8/1984 | Horton |
| 4,590,820 A | 5/1986 | Hambric |
| 4,641,543 A | 2/1987 | Jessup |
| 4,719,813 A * | 1/1988 | Chalik .................. 74/409 |
| 4,727,770 A * | 3/1988 | Ordo .................. 475/317 |
| 4,922,767 A | 5/1990 | Toshifumi |
| 5,108,353 A | 4/1992 | Brewer et al. |
| 5,222,406 A | 6/1993 | Shigeura |
| 5,251,878 A | 10/1993 | Mann et al. |
| 5,259,744 A | 11/1993 | Take |
| 5,363,714 A | 11/1994 | Hoguchi |
| 5,459,925 A * | 10/1995 | Akeel et al. ............... 29/893.2 |
| 5,533,943 A | 7/1996 | Ichioka et al. |

(Continued)

FOREIGN PATENT DOCUMENTS

JP 2003097653 A * 4/2003

*Primary Examiner*—Essama Omgba

(57) ABSTRACT

A method is provided for manufacturing a compound helically toothed planet gear for a planetary gear set wherein the individual gear elements of the compound planet gear have different leads. The method identifies and utilizes the several factors affecting gear timing for compound helical planet gears having different leads to provide planet gears capable of attaining equal load share among the several gears of the planetary gear set. Specifically, the method of the present invention utilizes a mounting shoulder and bore axis to provide common locating features for use throughout the manufacturing process The method further provides for bore honing and removal of equal amounts of material from both sides of each gear tooth in the gear finishing process so as not to alter gear timing between the compound gear elements.

20 Claims, 1 Drawing Sheet

U.S. PATENT DOCUMENTS

| | | |
|---|---|---|
| 5,558,594 A | 9/1996 | Lefranc et al. |
| 5,886,450 A | 3/1999 | Kuehnle |
| 6,117,036 A | 9/2000 | Lanzon et al. |
| 6,179,743 B1 | 1/2001 | Morrow |
| 6,263,571 B1 * | 7/2001 | Dooner et al. ........... 29/893.35 |
| 6,338,691 B1 | 1/2002 | Morrow |
| 6,386,060 B1 | 5/2002 | Epshteyn |
| 6,402,654 B1 | 6/2002 | Lanzon et al. |
| 6,449,846 B1 * | 9/2002 | Dooner et al. ........... 29/893.35 |
| 6,651,336 B1 * | 11/2003 | Bauknecht et al. ........... 29/893 |

* cited by examiner

METHOD OF MANUFACTURING COMPOUND HELICAL PLANET GEARS HAVING DIFFERENT LEADS

FIELD OF THE INVENTION

The present invention relates generally to planetary gear devices using compound helical planet gears. More particularly, the present invention relates to such planetary gear devices wherein the individual gear elements of the compound helical planet gears have different leads. Specifically, the present invention relates to a method for manufacturing such gears to attain equal load share among the multiple planet gears of a planetary gear set.

BACKGROUND OF THE INVENTION

Planetary gear sets are commonly used in transmissions and speed reduction devices in motor vehicle applications. It is known in such applications to use compound planet gears. Compound planet gears, as discussed herein, are gears having multiple gear elements i.e. pinions axially spaced from one another and integrally machined from a single piece of material or assembled from individual gears. Typically, a compound planet gear will have a large diameter element and one or more axially spaced smaller diameter element(s) disposed around a common axis. The use of such compound gears facilitates the manufacture of compact planetary gear sets.

It is desired in the manufacture of motor vehicles to reduce the noise, vibration, and harshness (NVH) characteristics of the power train. Previously, it has been known to use compound spur gears in planetary gear sets. However, spur gears have an inherent noise associated with them in operation. Further, regular spur gears have teeth that come into contact with mating gears along the entire face width and along a line parallel to the axis at all times. Helical gears on the other hand start contact at an interface point at one extreme and progress across the tooth width to an interface point at the other extreme. This results in the ability to operate helical gears at higher speeds and at greater loads than equivalent spur gears, while doing so in a smoother and quieter manner. Accordingly, it is preferred in many planetary gear applications to forego the use of conventional spur gears in favor of helical planet gears. However, the use of helical gears has certain disadvantages of its own. Because the force transmitted between teeth of meshing helical gears is always normal to the tooth surfaces, helical gears generate a component force along the axis of the gear causing end thrust. In the past the problem of end thrust has been dealt with in many ways including the use of herringbone gears and/or thrust bearings. However, such solutions are expensive and impractical in many situations. It has been discovered that axial gear forces produced by helical gears can be canceled in part by utilizing compound planet gears wherein the gear elements have different leads. The use of compound helical planet gears having gear elements with different leads also provides the advantage of allowing the individual gear elements to be designed independently of one another so as to optimize the performance capabilities of the planetary gear set. The use of such gears has previously been impractical due to the need to maintain timing of planet gears to share load equally and the lack of adequate manufacturing techniques to do so. As used herein the term "timing" refers to the relationship of one gear element to another. Simply put, timing of the multiple gear elements of a compound gear is the relationship that ensures that each gear element properly engages with its corresponding mating or meshing gear as the multiple gear elements are turning together, so that loads are properly shared without excess wear etc. While compound planet gears having gear elements with different leads can be timed during initial machining, most gear finishing processes currently used tend to change tooth profiles and axial spacing of the gear elements resulting in less than satisfactory timing. As a result of inaccurate timing gears fail. Improper manufacturing attempts have resulted in edge loading and ultimately gear failure. Accordingly, there is a clear need in the art for a method of manufacturing compound helical planet gears having different leads that maintains the timing between the compound gear elements and attains equal load share among the multiple planet gears of a planetary gear set.

SUMMARY OF THE INVENTION

In view of the foregoing, it is an object of the invention to provide a method for manufacturing compound helical planet gears for a planetary gear set.

An additional object of the invention is the provision of such a method that enables the independent design of each element of a compound planet gear so as to optimize the performance capabilities of the planetary gear set.

Another object of the invention is the provision of such a method wherein the individual elements of each compound planet gear have different leads.

Still another object of the invention is to provide compound planet gears for a planetary gear set which reduce the axial loads conventionally associated with helical gears.

A further object of the invention is to provide such a method wherein the timing of the individual elements of each compound planet gear relative to one another is maintained at each step of the manufacturing process so as to attain equal load share among the multiple planet gears of a planetary gear set.

The foregoing and other objects of the invention together with the advantages thereof over the known art which will become apparent from the detailed specification which follows are attained by a method for manufacturing compound helical planet gears having individual gear elements with different leads from a gear blank, comprising the steps of: establishing an axial bore in the gear blank; establishing a mounting shoulder on the gear blank at the periphery of the bore; machining a first helically toothed gear element having a first lead on the gear blank; establishing a reference tooth on the first helically toothed gear element; machining additional helically toothed gear elements from the blank using the mounting shoulder as a baseline reference to establish the axial spacing of the additional helically toothed gear elements in relation to the first helically toothed gear element, a tooth of each of the additional helically toothed gear elements having a timed relationship in a circumferential direction with the reference tooth of the first helically toothed gear element, the additional helically toothed gear elements having different leads than the first helically toothed gear element.

Other objects of the invention are attained by a method for manufacturing a planetary gear assembly having a planet carrier, and compound helical planet gears with individual gear elements having different leads, wherein each compound helical planet gear is machined from a single gear blank, comprising the steps of: establishing an axial bore in the gear blank; establishing a mounting shoulder on the gear blank at the periphery of the bore; machining a first helically toothed gear element having a first lead on the gear blank;

establishing a reference tooth on the first helically toothed gear element; and, machining additional helically toothed gear elements from the blank using the mounting shoulder as a baseline reference to establish the axial spacing of the additional helically toothed gear elements in relation to the first helically toothed gear element, a tooth of each of the additional helically toothed gear elements having a timed relationship in a circumferential direction with the reference tooth of the first helically toothed gear element, the additional helically toothed gear elements having different leads than the first helically toothed gear element.

Still other objects of the invention are attained by a method of manufacturing compound helical planet gears having individual gear elements with different leads comprising the steps of: establishing an axial bore in a first gear blank; establishing a mounting shoulder on the first gear blank at the periphery of the bore; machining a helically toothed gear element having a lead on the first gear blank; establishing a reference tooth on the helically toothed gear element; repeating the above steps to machine additional helically toothed gear elements from additional gear blanks using the mounting shoulders as baseline references to establish the axial spacing of the additional helically toothed gear elements in relation to the first helically toothed gear element, the reference tooth of each of the additional helically toothed gear elements having a timed relationship in a circumferential direction with the reference tooth of the first helically toothed gear element, the additional helically toothed gear elements having different leads than the first helically toothed gear element.

Still further objects of the invention are attained by a method for manufacturing a planetary gear assembly having a planet carrier, and compound helical planet gears with individual gear elements having different leads, comprising the steps of: establishing an axial bore in a gear blank; establishing a mounting shoulder on the gear blank at the periphery of the bore; machining a helically toothed gear element having a lead on the gear blank; establishing a reference tooth on the helically toothed gear element; and, repeating the above steps to machine additional helically toothed gear elements from additional blanks using the mounting shoulders as baseline references to establish the axial spacing of the additional helically toothed gear elements in relation to the first helically toothed gear element, the reference tooth of each of the additional helically toothed gear elements having a timed relationship in a circumferential direction with the reference tooth of the first helically toothed gear element, the additional helically toothed gear elements having different leads than the first helically toothed gear element.

In general, a method is provided for manufacturing a compound helically toothed planet gear for a planetary gear set wherein the individual gear elements of the compound planet gear have different leads. The method identifies and utilizes the several factors affecting gear timing for compound helical planet gears having different leads to provide planet gears capable of attaining equal load share among the several gears of the planetary gear set. Specifically, the method of the present invention utilizes a mounting shoulder and bore axis to provide common locating features for use throughout the manufacturing process The method further provides for bore honing and removal of equal amounts of material from both sides of each gear tooth in the gear finishing process so as not to alter gear timing between the compound gear elements.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
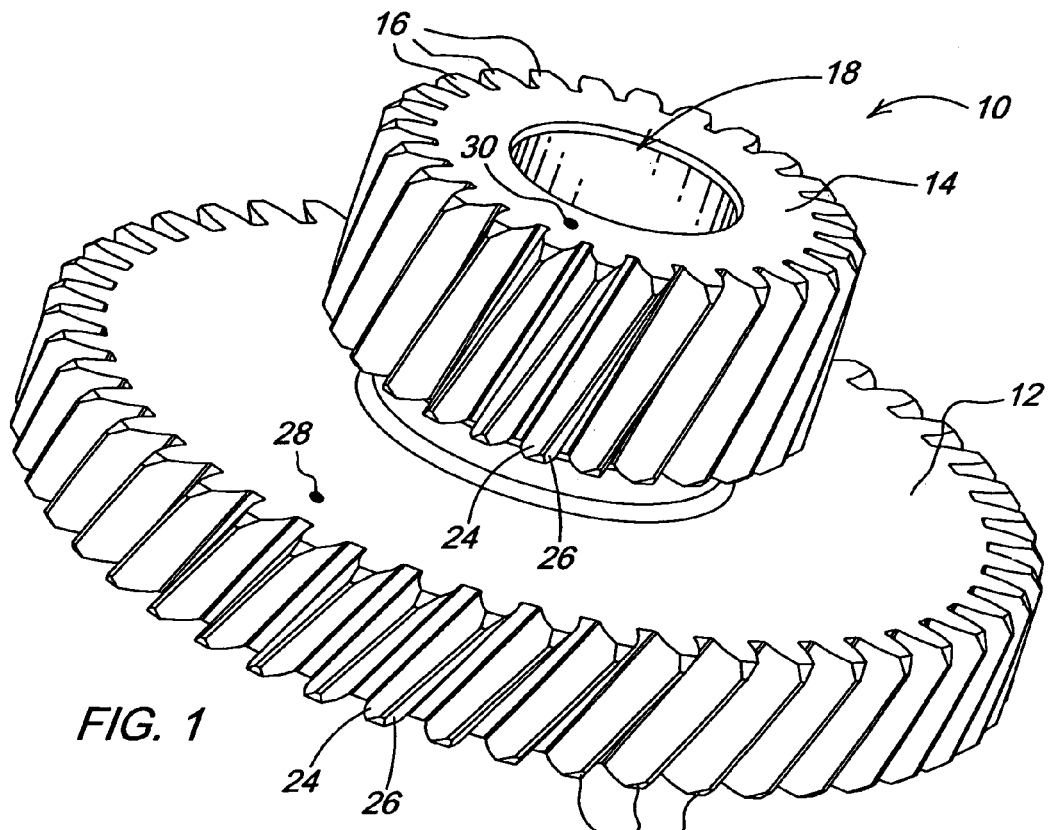
FIG. 1 is a perspective view of a compound helical planet gear manufactured using the method of the present invention; and, FIG. 2 is a perspective view of the reverse side of the compound helical planet gear of FIG. 1.
Figure 2:
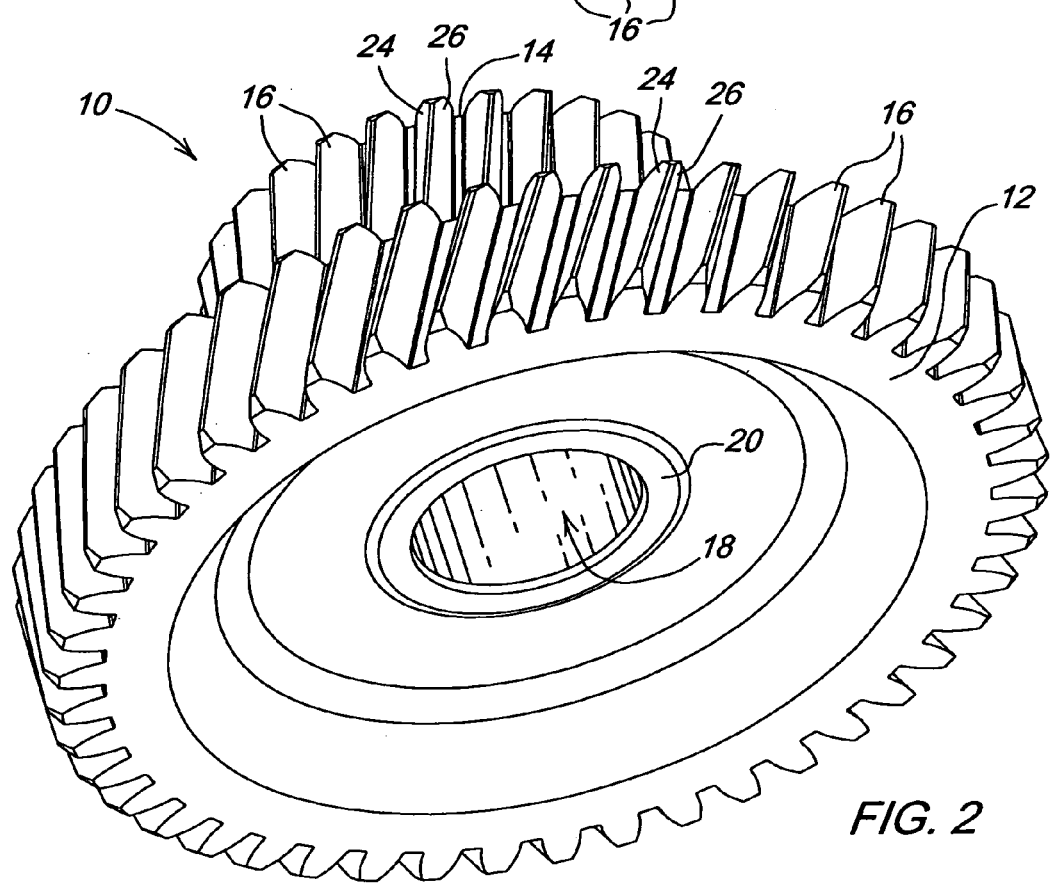

Before embarking on a detailed description of the method of the present invention it is important to first set forth a description of a representative compound helical planet gear so as to provide a frame of reference in understanding the method. Accordingly, attention is directed to FIGS. 1 and 2 wherein a compound helical planet gear manufactured using the method of the present invention is designated generally by the numeral 10. Gear 10 is comprised generally of a first helically toothed gear element 12 and a second helically toothed gear element 14. First and second gear elements 12 and 14 are integrally machined on a single piece of material to form the compound gear 10. Those having skill in the art will recognize that while gear 10 is illustrated herein as being integrally machined from a single gear blank it is within the scope of the invention to manufacture a compound planet gear by assembling together gear elements from separate blanks. It will be noted that second gear element 14 has a smaller diameter than first gear element 12. Those having skill in the art will recognize that while the representative planet gear 10 described herein has only two elements, it is within the scope of the invention to manufacture planet gears having multiple gear elements of varying diameters. Gear elements 12 and 14 are each defined by a plurality of helical teeth 16. It should be noted that while the helix angles of gear elements 12 and 14 are of the same hand, the helix angle of the teeth 16 of first gear element 12 is different than that of second gear element 14. Accordingly, first gear element 12 is provided with a different lead than that of second gear element 14. Those having skill in the art will recognize that while the gear 10 illustrated herein has gear elements having the same hand it is within the scope of the invention to provide gear elements having opposite hands. The invention herein is applicable to gears having all combinations of element hands. First gear element 12 and second gear element 14 are disposed around a common axial bore 18. Gear 10 further includes a mounting shoulder 20 (FIG. 2) at the periphery of bore 18. Each tooth 16 of first and second gear elements 12 and 14 is defined by a first face 24 on one side of the tooth and a second face 26 on the opposite side of the tooth.

It is well established that in order for planet gears within a planetary gear set to share load equally the planet gears must be timed with one another. Timing of compound planet gears is accomplished by establishing a reference tooth on a first gear element and machining a first tooth on the second gear element that is radially aligned with both the axis of the gear and the reference tooth of the first gear element. Additional teeth are subsequently machined circumferentially around the gear at predetermined intervals so that a timed relationship between the first gear element and the second gear element is maintained circumferentially around the gear. The present invention is directed toward a process for maintaining the timing between the several planet gears of a planetary gear set throughout the gear manufacturing process. The method of the present invention begins with a gear blank which has been machined to a profile close to that of the finished gear. A bore 18 is then established in the gear blank. A mounting shoulder 20 is next established on the blank. An important feature of the present invention is that once the mounting shoulder 20 and the axis of the bore 18 have been established these elements must be maintained unaltered throughout the remainder of the manufacturing process. It should be recognized that the diameter of the bore 18 can be subsequently enlarged provided that the location of the axis is not changed. Once the bore axis and mounting shoulder have been established the teeth of the first gear element 12 are cut on the gear blank using known techniques for hobbing helical gears. A novel aspect of the present invention is that the individual elements of the compound planet gears can be designed independently of one another so as to optimize performance of the gear train. Accordingly, gear design choices such as number of teeth, helix angle, pitch, face width etc. for the first gear element 12 are left to the designer of the gear train without the additional constraints normally associated with compound gears having elements with the same lead. However, it is important to recognize that the leads chosen for the individual gear elements are selected based upon factors which will become apparent as the description continues.

Once the first gear element 12 has been established on the blank, a tooth 28 is chosen as a reference tooth, as previously described. The second gear element 14 is then machined on the blank using the mounting shoulder 20 as a baseline to establish the axial spacing of the second gear element 14 relative to the first gear element 12. Similarly, the axis of bore 18 is used as a baseline reference to establish radial concentricity of the gear elements. Those having skill in the art will now recognize why the bore axis and mounting shoulder cannot be changed. Any modification with respect to the axis or shoulder will result in a compound planet gear which will perform poorly and/or fail. During machining the teeth 16 of the second gear element 14 are timed in the circumferential direction, as described above, using the reference tooth of the first gear element 12 as a baseline reference. More particularly a first tooth 30 of the second gear element 14 is radially aligned with both the axis of the gear and the reference tooth 28 of the first gear element so that when additional teeth are machined on the second element 14, a timed relationship is maintained circumferentially around the gear. It should be recognized that additional gear elements could be machined on a gear blank using the same steps for each element.

If it is desired to manufacture the compound helical planet gear from individual gear elements machined from separate gear blanks it is only necessary to establish a mounting shoulder and bore axis for each gear element so as to facilitate timing of the elements during assembly. As discussed above it is necessary to maintain the shoulder and axis throughout the manufacturing process so as not to alter the timing.

While the use of compound planet gears having gear elements with different leads serves to cancel axial forces in part, the remainder of the axial load serves to positively locate each planet gear against the shoulder so that equal load share is achieved. Accordingly, the leads chosen for the individual gear elements must be selected so as to provide enough thrust to positively locate the planets against the shoulder yet remain within the load limits of the bearings.

If the preceding steps are followed the gear elements 12 and 14 will now have proper axial and radial spacing as well as timing to attain equal load share within the planetary gear set. Accordingly, the method of the present invention requires that subsequent gear finishing operations be done in a way that will not alter the spacing and/or timing of the individual gear elements relative to one another so as to effect planet load share. Specifically, in finishing the bore to establish a final fit it is necessary to use a honing or equivalent process which follows the existing bore axis. Techniques such as bore grinding can change the location of the bore axis, thereby altering gear timing. With respect to tooth finishing it is essential that equal amounts of material be removed from the first and second tooth faces 24 and 26 so that the timing of the gear elements is not altered. This can be accomplished using a shaving process when the gear is still in the green state, but it is preferred to finish the teeth using power honing on the hardened gear as it provides increased control in the finishing process.

The steps of the method set forth above will enable one having skill in the art to manufacture compound helical planet gears having different leads so as to attain equal load share among the several planets of a planetary gear set. However, additional factors can negate the benefits achieved using the above method if additional procedures are not observed during the assembly of the planetary gear assembly. More particularly, parts stack-up tolerances between the planet carrier and the planet gears must be considered to ensure that the planet gears are maintained on a common plane. Specifically, it is necessary that bearings and bearing seats in the planet carrier be held to tight manufacturing tolerances. Similarly, retaining rings must also be held to tight tolerances so as not to alter gear timing as a result of assembly.

It should now be apparent that the method set forth above identifies and utilizes the several factors affecting gear timing for compound helical planet gears having different leads to provide planet gears capable of attaining equal load share among the several gears of the planetary gear set. Specifically, the method of the present invention identifies and consistently uses common locating features for all manufacturing processes and in the application allow the timing relationship to be created and preserved between the various elements of the compound planet gears.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to The embodiments of the invention in which an exclusive property or privilege is claimed are defined as follows:

1. A method for manufacturing compound helical planet gears having individual gear elements with different leads from a gear blank, comprising the steps of:
   establishing an axial bore in the gear blank;
   establishing a mounting shoulder on the gear blank at the periphery of the bore;
   machining a first helically toothed gear element having a first lead on the gear blank;
   establishing a reference tooth on the first helically toothed gear element; and,
   machining additional helically toothed gear elements from the blank using the mounting shoulder as a baseline reference to establish the axial spacing of the additional helically toothed gear elements in relation to the first helically toothed gear element, a tooth of each of the additional helically toothed gear elements having a timed relationship in a circumferential direction with the reference tooth of the first helically toothed gear element, the additional helically toothed gear elements having different leads than the first helically toothed gear element.

2. A method for manufacturing compound helical planet gears having individual gear elements with different leads from a gear blank as set forth in claim 1 comprising the further step of honing the bore to establish a final shaft fit.

3. A method for manufacturing compound helical planet gears having individual gear elements with different leads from a gear blank as set forth in claim 2 comprising the further step of removing equal amounts of material from both sides of each tooth of the helically toothed gear elements to establish a final tooth profile.

4. A method for manufacturing compound helical planet gears having individual gear elements with different leads from a gear blank as set forth in claim 1 comprising the further step of removing equal amounts of material from both sides of each tooth of the helically toothed gear elements to establish a final tooth profile.

5. A method for manufacturing a planetary gear assembly having a planet carrier, and compound helical planet gears with individual gear elements having different leads, wherein each compound helical planet gear is machined from a single gear blank, comprising the steps of:
   establishing an axial bore in the gear blank;
   establishing a mounting shoulder on the gear blank at the periphery of the bore;
   machining a first helically toothed gear element having a first lead on the gear blank;
   establishing a reference tooth on the first helically toothed gear element; and,
   machining additional helically toothed gear elements from the blank using the mounting shoulder as a baseline reference to establish the axial spacing of the additional helically toothed gear elements in relation to the first helically toothed gear element, a tooth of each of the additional helically toothed gear elements having a timed relationship in a circumferential direction with the reference tooth of the first helically toothed gear element, the additional helically toothed gear elements having different leads than the first helically toothed gear element.

6. A method for manufacturing a planetary gear assembly as set forth in claim 5 comprising the further step of honing the bore of each compound helical planet gear to establish a final shaft fit.

7. A method for manufacturing a planetary gear assembly as set forth in claim 6 comprising the further step of removing equal amounts of material from both sides of each tooth of the helically toothed gear elements to establish a final tooth profile.

8. A method for manufacturing a planetary gear assembly as set forth in claim 7 comprising the further step of establishing bearing seats in the planet carrier for journaling each of the compound planet gears in the planet carrier, each bearing seat being co-planar with the other bearing seats.

9. A method of manufacturing a planetary gear assembly as set forth in claim 8 comprising the further step of journaling each compound planet gear in the planet carrier by way of bearings mounted in the bearing seats of the planet carrier, each of the bearings being co-planar with each of the other bearings.

10. A method for manufacturing a planetary gear assembly as set forth in claim 5 comprising the further step of removing equal amounts of material from both sides of each tooth of the helically toothed gear elements to establish a final tooth profile.

11. A method of manufacturing compound helical planet gears having individual gear elements with different leads comprising the steps of:
   establishing an axial bore in a first gear blank;
   establishing a mounting shoulder on the first gear blank at the periphery of the bore;
   machining a first helically toothed gear element having a lead on the first gear blank;
   establishing a reference tooth on the helically toothed gear element;
   repeating the above steps to machine additional helically toothed gear elements from additional gear blanks using established mounting shoulders as baseline references to establish the axial spacing of the additional helically toothed gear elements in relation to the first helically toothed gear element, the reference tooth of each of the additional helically toothed gear elements having a timed relationship in a circumferential direction with the reference tooth of the first helically toothed gear element, the additional helically toothed gear elements having different leads than the first helically toothed gear element.

12. A method for manufacturing compound helical planet gears having individual gear elements with different leads as set forth in claim 11 comprising the further step of honing the bores to establish a final shaft fit.

13. A method for manufacturing compound helical planet gears having individual gear elements with different leads as set forth in claim 12 comprising the further step of removing equal amounts of material from both sides of each tooth of the helically toothed gear elements to establish a final tooth profile.

14. A method for manufacturing compound helical planet gears having individual gear elements with different leads as set forth in claim 11 comprising the further step of removing equal amounts of material from both sides of each tooth of the helically toothed gear elements to establish a final tooth profile.

15. A method for manufacturing a planetary gear assembly having a planet carrier, and compound helical planet gears with individual gear elements having different leads, comprising the steps of:

establishing an axial bore in a gear blank;
establishing a mounting shoulder on the gear blank at the periphery of the bore;
machining a first helically toothed gear element having a lead on the gear blank;
establishing a reference tooth on the helically toothed gear element; and,
repeating the above steps to machine additional helically toothed gear elements from additional blanks using established mounting shoulders as baseline references to establish the axial spacing of the additional helically toothed gear elements in relation to the first helically toothed gear element, the reference tooth of each of the additional helically toothed gear elements having a timed relationship in a circumferential direction with the reference tooth of the first helically toothed gear element, the additional helically toothed gear elements having different leads than the first helically toothed gear element.

16. A method for manufacturing a planetary gear assembly as set forth in claim 15 comprising the further step of honing the bore of each helically toothed element of each compound helical planet gear to establish a final shaft fit.

17. A method for manufacturing a planetary gear assembly as set forth in claim 16 comprising the further step of removing equal amounts of material from both sides of each tooth of the helically toothed gear elements to establish a final tooth profile.

18. A method for manufacturing a planetary gear assembly as set forth in claim 17 comprising the further step of establishing bearing seats in the planet carrier for journaling each of the compound planet gears in the planet carrier, each bearing seat being co-planar with the other bearing seats.

19. A method of manufacturing a planetary gear assembly as set forth in claim 18 comprising the further step of journaling each compound planet gear in the planet carrier by way of bearings mounted in the bearing seats of the planet carrier, each of the bearings being co-planar with each of the other bearings.

20. A method for manufacturing a planetary gear assembly as set forth in claim 15 comprising the further step of removing equal amounts of material from both sides of each tooth of the helically toothed gear elements to establish a final tooth profile.

* * * * *